United States Patent
Maehara (10) Patent No.: US 9,315,075 B2
(45) Date of Patent: Apr. 19, 2016

(54) PNEUMATIC TIRE

(71) Applicant: Sumitomo Rubber Industries, Ltd., Kobe-shi, Hyogo (JP)

(72) Inventor: Atsushi Maehara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 537 days.

(21) Appl. No.: 13/793,641

(22) Filed: Mar. 11, 2013

(65) Prior Publication Data
US 2013/0240103 A1 Sep. 19, 2013

(30) Foreign Application Priority Data

Mar. 15, 2012 (JP) .................................. 2012-059097

(51) Int. Cl.
*B60C 11/13* (2006.01)
*B60C 11/03* (2006.01)

(52) U.S. Cl.
CPC ............. *B60C 11/03* (2013.01); *B60C 11/0306* (2013.04); *B60C 11/0309* (2013.04); *B60C 11/033* (2013.04); *B60C 2011/036* (2013.04); *B60C 2011/0353* (2013.04); *B60C 2011/0355* (2013.04); *B60C 2011/0365* (2013.04); *B60C 2011/0367* (2013.04); *B60C 2011/0372* (2013.04); *B60C 2200/04* (2013.04); *B60C 2200/06* (2013.04)

(58) Field of Classification Search
CPC ........ B60C 11/03; B60C 11/11; B60C 11/13; B60C 11/1281; B60C 11/1272; B60C 11/1213; B60C 2011/0372; B60C 2011/0358; B60C 2011/036; B60C 11/033; B60C 11/0306; B60C 11/0309; B60C 11/1315; B60C 2011/0353; B60C 2011/0355; B60C 2011/0365; B60C 2011/0367; B60C 2201/04; B60C 2200/06

USPC ............. 152/209.12, 209.13, 209.18, 209.24, 152/209.25, 209.28
See application file for complete search history.

(56) References Cited

U.S. PATENT DOCUMENTS

| | | | | |
|---|---|---|---|---|
| 2,604,920 A * | 7/1952 | Kirby | ................. | B60C 11/0309 152/151 |
| 3,847,698 A * | 11/1974 | Ravenhall | ........... | B60C 11/0309 152/209.24 |
| 4,840,211 A * | 6/1989 | Makino | ................. | B60C 11/042 152/209.24 |
| 5,417,268 A * | 5/1995 | Kishi | ................. | B60C 11/0309 152/209.18 |
| 6,142,200 A * | 11/2000 | Feider | ................. | B60C 11/0309 152/209.14 |
| 6,192,953 B1 * | 2/2001 | Fukumoto | ............... | B60C 11/01 152/209.16 |
| 6,415,834 B1 * | 7/2002 | Carra | ................. | B60C 11/0306 152/209.15 |

(Continued)

FOREIGN PATENT DOCUMENTS

JP 2006-341769 A 12/2006

*Primary Examiner* — Eric Hug
(74) *Attorney, Agent, or Firm* — Birch, Stewart, Kolasch & Birch, LLP (57) ABSTRACT

A pneumatic tire comprises a tread portion with a land ratio of from 75% to 80%, the tread portion provided with crown main grooves having groove widths of 2.0-8.0 mm and groove depths of 15.0-20.0 mm, shoulder main grooves having groove widths of from 8.0-14.0 mm and groove depths of from 15.0-20.0 mm and lateral narrow grooves with groove widths of 0.6-2.0 mm and groove depths of 15.0-20.0 mm, wherein each main groove has a cross section including a groove bottom and groove walls, each groove wall includes an inner part and an outer part, the inner part has an inclination of not more than 1 degree with respect to a groove centerline, and the outer part has an inclination larger than that of the inner part.

18 Claims, 5 Drawing Sheets

(56) References Cited

U.S. PATENT DOCUMENTS

| | | | |
|---|---|---|---|
| 6,481,480 B1* | 11/2002 | Schuster | B60C 11/11 152/209.18 |
| 6,568,444 B1* | 5/2003 | Kaneko | B60C 3/04 152/209.18 |
| 2011/0048603 A1* | 3/2011 | Kleffmann | B60C 11/04 152/209.21 |

* cited by examiner

PNEUMATIC TIRE

BACKGROUND OF THE INVENTION

1. Field of the Invention

The present invention relates to a pneumatic tire decreased in rolling resistance while maintaining braking performance on wet road.

2. Description of the Related Art

In recent years, a pneumatic tire with low rolling resistance is requested by customers in order to improve fuel efficiency of passenger cars. Basically, energy loss generated in a tire tread portion accounts for about 50% of the rolling resistance of the tire. Therefore, in order to decrease the rolling resistance of the tire by preventing a large deformation of the tread portion, it is proposed to reduce the volume of crown and shoulder main grooves provided on the tread portion so as to improve the compression resistance thereof.

However, the tire is liable to deteriorate a drainage performance, such as braking performance on wet road due to crown and shoulder main grooves having low volume.

SUMMARY OF THE INVENTION

The present invention has been worked out in light of the circumstances described above, and has a main object of providing a pneumatic tire decreased in rolling resistance while maintaining braking performance on wet road.

In accordance with the present invention, there is provided a pneumatic tire comprising a tread portion provided with a pair of circumferentially extending crown main grooves disposed both sides of a tire equator to define a crown portion therebetween, the crown main grooves having groove widths in a range of from 2.0 to 8.0 mm and groove depths in a range of from 15.0 to 20.0 mm, a pair of circumferentially extending shoulder main grooves disposed axially outside the crown main grooves to form a pair of middle portions each of which is between the shoulder main groove and the crown main groove in each side of the tire equator, the shoulder main grooves having groove widths in a range of from 8.0 to 14.0 mm and groove depths in a range of from 15.0 to 20.0 mm and a plurality of lateral narrow grooves having groove widths in a range of from 0.6 to 2.0 mm and groove depths in a range of from 15.0 to 20.0 mm, said lateral narrow grooves including a plurality of crown lateral narrow grooves each of which traverses said crown portions and a plurality of middle lateral narrow grooves each of which traverses said middle portions, and said tread portion having a land ratio in a range of from 75% to 80%, wherein each of said crown main grooves and shoulder main grooves has a groove cross section including a groove bottom and a pair of groove walls each extending from the groove bottom to a ground contact surface of said tread portion respectively, each groove wall includes an inner part and an outer part, the inner part of the groove wall has an inclination in a range of not more than 1 degree with respect to a groove centerline in the groove cross section, and the outer part is provided between the inner part and the ground contact surface of the tread portion and has an inclination larger than that of the inner part so as to enlarge the groove width thereof toward the ground contact surface.

DETAILED DESCRIPTION

An embodiment of the present invention will be explained below with reference to the accompanying drawings.

Figure 1:
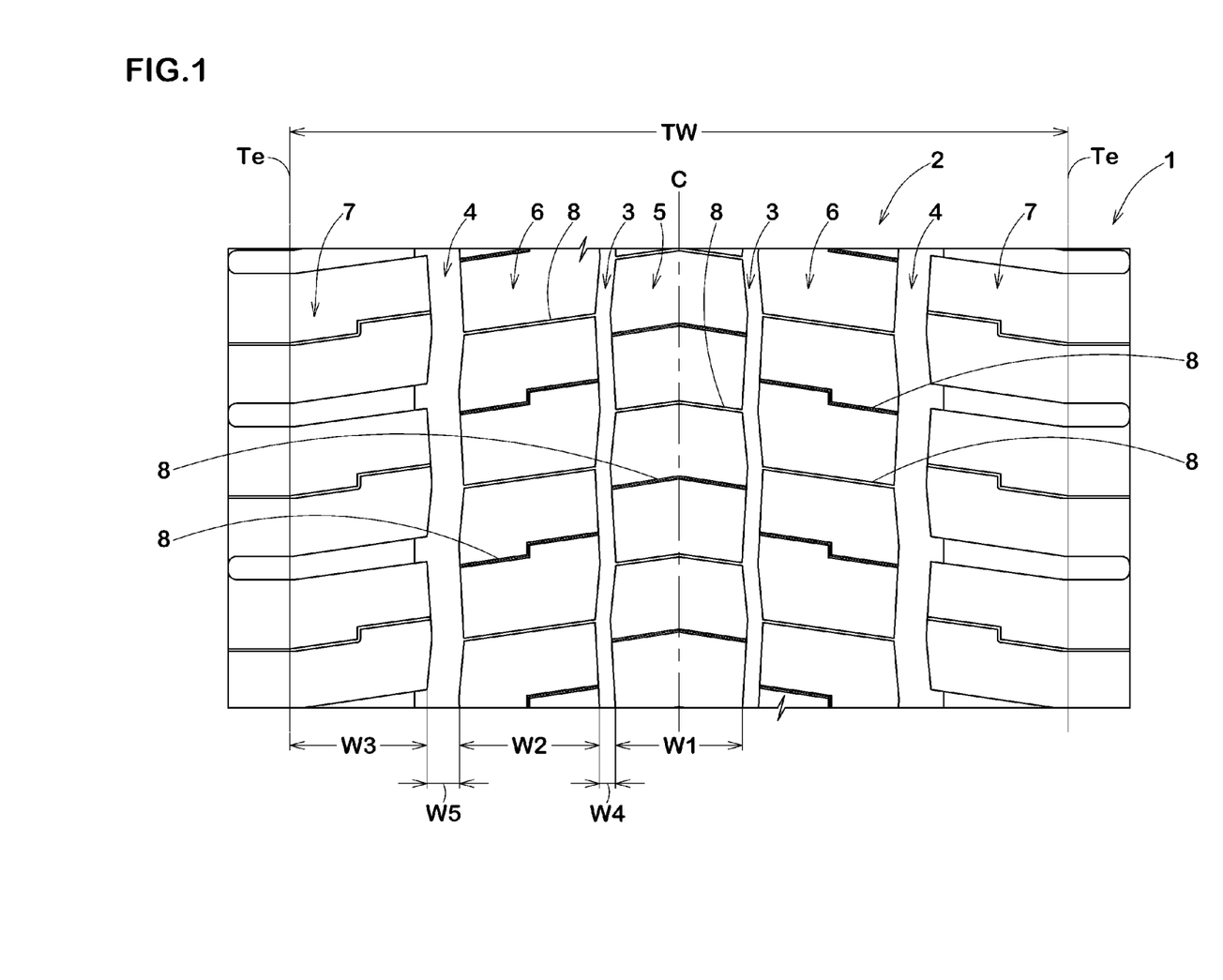
FIG. 1 is a development view of a tread portion of a pneumatic tire showing an embodiment of the present invention.

FIG. 1 is a developed view of a tread portion 2 of a pneumatic tire showing an embodiment of the present invention. Referring to FIG. 1, the pneumatic tire 1 includes the tread portion 2 being provided with a pair of circumferentially extending crown main grooves 3 disposed both sides of a tire equator C and a pair of circumferentially extending shoulder main grooves 4 disposed axially outside the crown main grooves 3. In this embodiment, a heavy duty radial tire 1 is illustrated. By providing such main grooves 3, 4, the tread portion 2 is separated into a crown portion 5 between the crown main grooves 3, 3, a middle portion 6 between the crown main groove 3 and the shoulder main groove 4 in each side of the tire equator C, and a shoulder portion 7 disposed axially outside the shoulder main groove 4 in each side of the tire equator C.

Preferably, the crown portion 5 has a width w1 along in the axial direction of the tire in a range of from 12% to 16% of a tread width TW.

Here, the tread width TW means the width measured under a normally inflated unloaded condition, as the axial distance between tread edges Te.

The normally inflated unloaded condition means such that the tire is mounted on a standard wheel rim and inflated to a standard pressure but loaded with no tire load. In this application including specification and claims, various dimensions, positions and the like of the tire refer to those under the normally inflated unloaded condition of the tire unless otherwise noted.

The standard wheel rim means a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure means the "maximum air pressure" in JATMA, the "Inflation Pressure" in ETRTO, and the maximum pressure given in the "Tire Load Limits at various Cold Inflation Pressures" table in TRA or the like.

The tread edge Te means the axial outermost edges of the ground contacting patch which occurs under a normally inflated loaded condition when the camber angle of the tire is set to zero.

The normally inflated loaded condition means such that the tire is mounted on the standard wheel rim and inflated to the standard pressure and loaded with a standard tire load.

The standard load means the "maximum load capacity" in JATMA, the "Load Capacity" in ETRTO, and the maximum value given in the above-mentioned table in TRA or the like.

Preferably, the middle portion 6 has a width w2 along in the axial direction of the tire in a range of from 13% to 17% of the tread width TW. Preferably, the shoulder portion 7 has a width w3 along in the axial direction of the tire in a range of from 20% to 24% of the tread width TW.

Each of the crown portion 5 and middle portions 6 is provided with a plurality of lateral narrow grooves 8 each of which traverses the crown portion 5 or the middle portions 6.

The lateral narrow grooves 8 have groove widths w7 (not shown) in a range of from 0.6 to 2.0 mm, and groove depths d4 (not shown) in a range of from 15.0 to 20.0 mm. Such lateral narrow grooves 8 may improve drainage performance of the tire due to its lateral edges as well as braking performance on wet road. Although each lateral narrow groove 8 separates the crown portion 5 or the middle portion 6 into a plurality of pieces, rigidity of the crown and middle portions 5, 6 in the circumferential direction of the tire are maintained. Accordingly, the crown portion 5 and the middle portion 6 may be allowed to deform in the axial direction of the tire while they ground.

In one aspect of the present invention, the lateral narrow groove 8 traverses the crown portion 5 so as to extend in a v-shape in order to maintain the rigidity of the crown portion 5. In another aspect of the present invention, the lateral narrow groove 8 traverses the middle and shoulder portions 6, 7 so as to extend in a step-like shape in order to maintain the rigidity of the middle and shoulder portions 6, 7.

Figure 2:
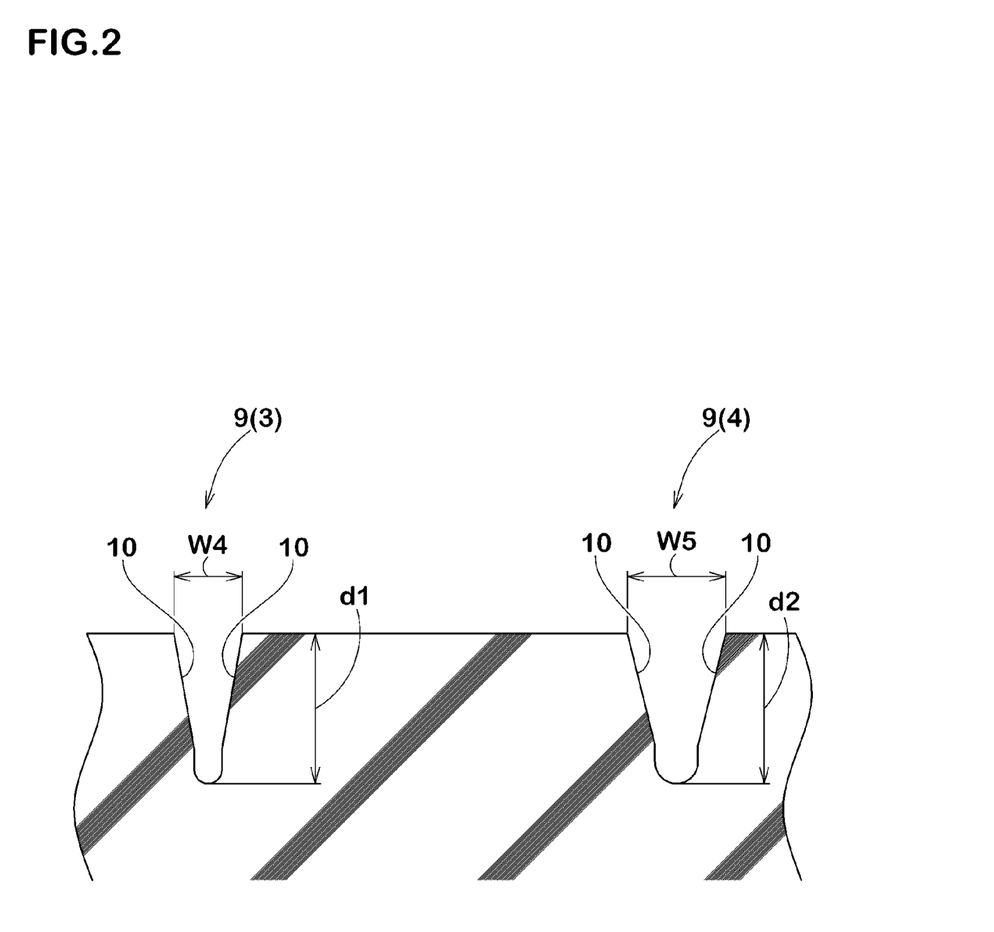
FIG. 2 is a cross sectional view of a crown main groove and a shoulder main groove of FIG. 1.

FIG. 2 shows a cross sectional view of the crown main groove 3 and the shoulder main groove 4. Hereinafter, the main grooves 3 and 4 may be simply referred to as "main groove 9" in the specification.

Referring to FIG. 2, the crown main groove 3 has a groove width W4 in a range of from 2.0 to 8.0 mm. When the groove width W4 is less than 2.0 mm, wet braking performance of the tire is liable to deteriorate. When the groove width W4 is more than 8.0 mm, the rolling resistance of the tire is liable to increase due to low pattern rigidity of the tread portion thereof. Preferably, the groove width W4 is set in a range of from 4.0 to 6.0 mm.

The crown main groove 3 has a groove depth d1 in a range of from 15.0 to 20.0 mm. When the groove depth d1 is less than 15.0 mm, wet braking performance of the tire is liable to deteriorate due to low drainage performance of the tread portion thereof. When the groove depth d1 is more than 20.0 mm, the rolling resistance of the tire is liable to increase due to low pattern rigidity of the tread portion thereof, as well as the durability of the tread portion 2 is liable to deteriorate by approaching a groove bottom thereof to a belt layer (not shown) in the tread portion. Preferably, the groove depth d1 is set in a range of from 17.0 to 18.0 mm.

The shoulder main groove 4 has a groove width w5 in a range of from 8.0 to 14.0 mm in order to improve the drainage performance of the tire. Preferably, the groove width w5 is larger than the groove width W4 of the crown main groove 3. Preferably, the ratio w5/W4 is in a range of from not less than 1.75, more preferably not less than 2.5, but preferably mot more than 4.0, more preferably not more than 3.5. Thus, the drainage performance around shoulder portion 7 may be improved while enhancing the ground contact pressure on the crown portion 5.

The shoulder main groove 4 has a groove depth d2 in a range of from 15.0 to 20.0 mm, preferably in a range of from 17.0 to 18.0 mm.

The tread portion 2 has a land ratio in a range of from 75% to 80% in order to maintain both the pattern rigidity and the drainage performance thereof in well-balanced. Here, the land ratio Sb/Sa is a ratio of the actual ground contacting area "Sb" to the gross area "Sa". The actual ground contacting area "Sb" is measured while rolling the tire under the normally inflated loaded condition. When the land ratio Sb/Sa is less than 75%, not only the rolling resistance but also the steering stability of the tire are liable to deteriorate due to low rigidity of the tread portion 2. When the land ratio Sb/Sa is more than 80%, wet braking performance may be deteriorate due to low drainage performance of the tread portion 2. Preferably, the land ratio Sb/Sa is in a range of from 77% to 78%.

Figure 3:
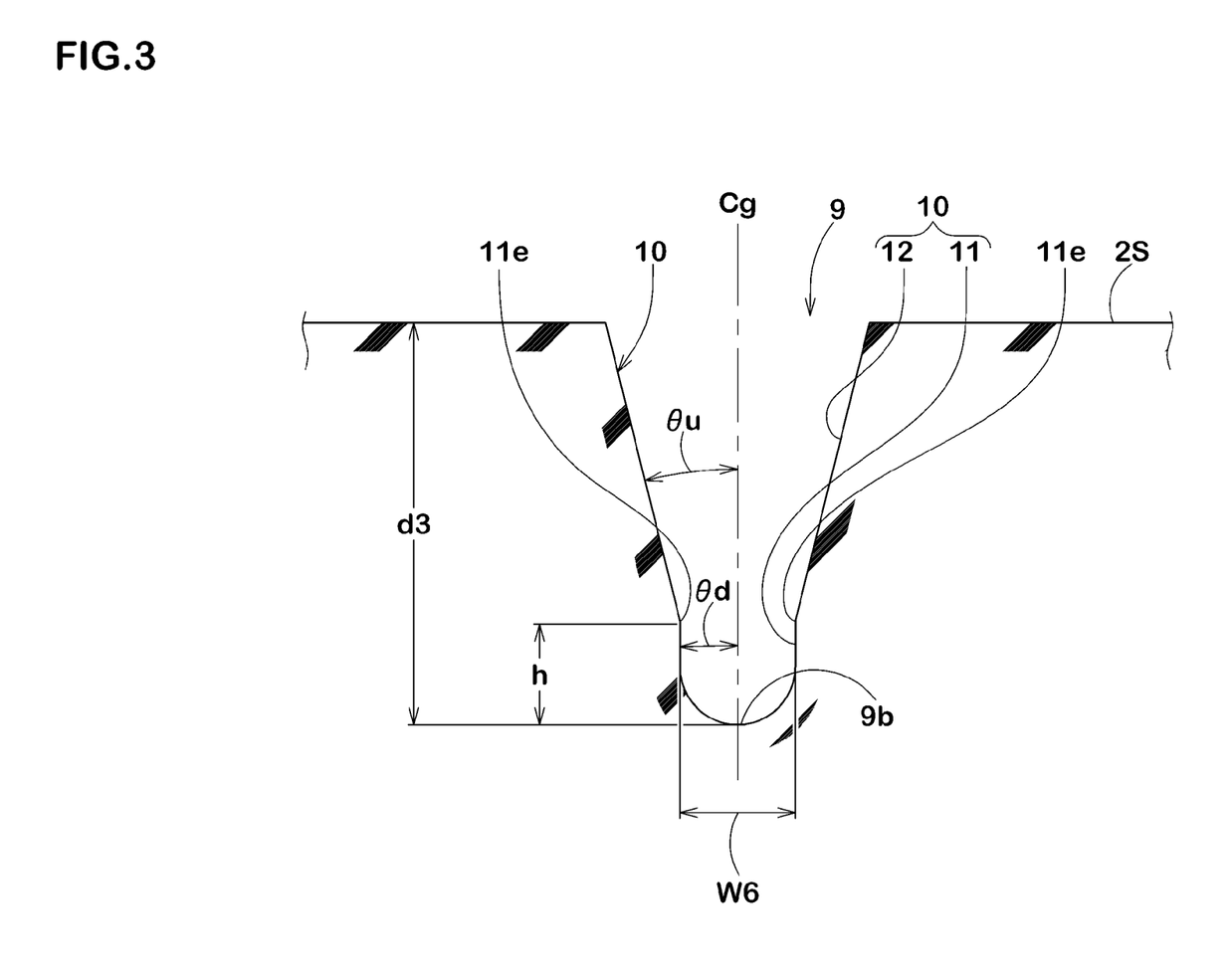
FIG. 3 is an enlarged cross sectional view of the shoulder main groove of FIG. 1.

FIG. 3 shows an enlarged cross sectional view taken along the right angle with respect to the longitudinal direction of the main groove 9. Referring to FIG. 3, the main groove 9 has a symmetrically cross-section with respect to the groove centerline cg thereof, and which comprises a groove bottom 9b and a pair of groove walls 10 each extending from the groove bottom 9b to the ground contact surface 25 of the tread portion 2, respectively. Each groove wall 10 includes a radially inner part 11 and a radially outer part 12.

Figure 4:
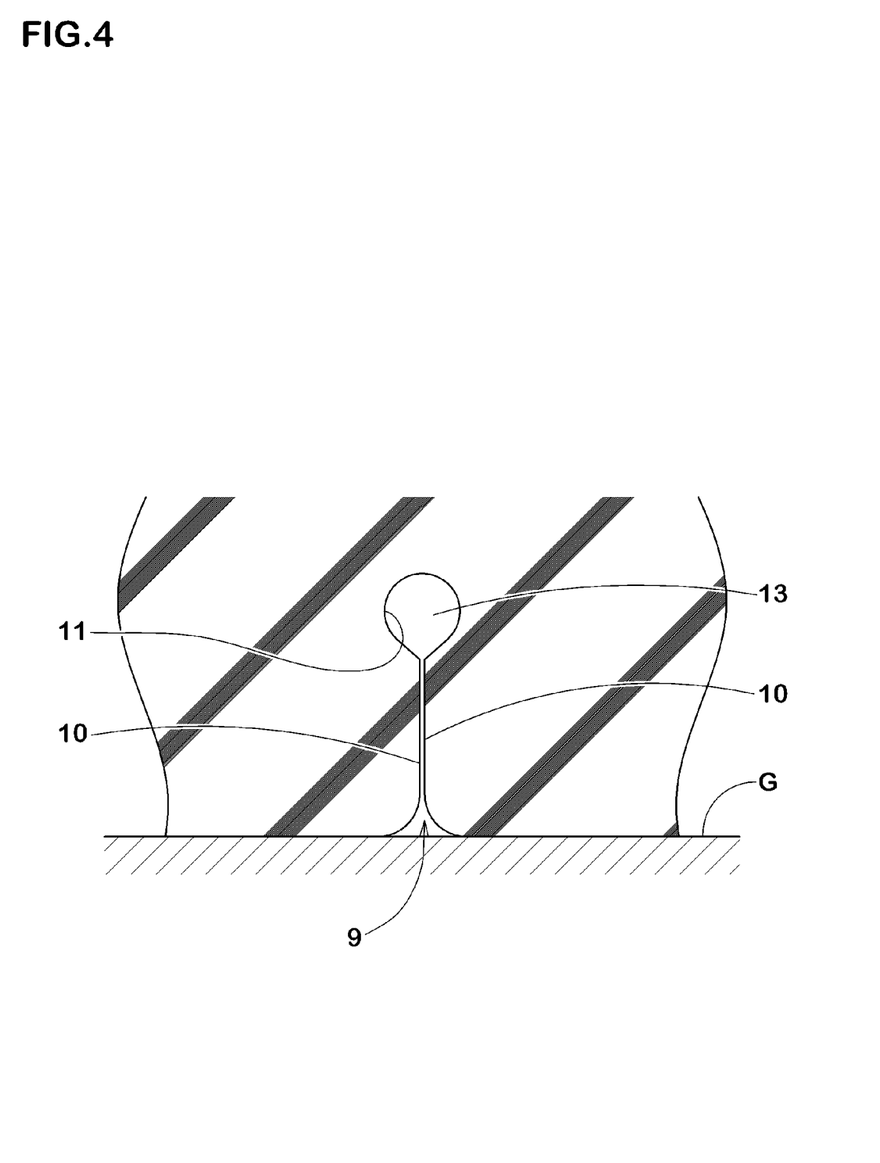
FIG. 4 is a cross sectional view of the shoulder main groove of FIG. 1 on which a load is loaded.

The inner part 11 of the groove wall 10 has an inclination angle θd in a range of not more than 1 degree with respect to the groove centerline Cg. The outer part 12 is provided between the inner part 11 and the ground contact surface 25 of the tread portion 2, and has an inclination angle θu larger than that of the inner part 11 so as to enlarge the groove width thereof toward the ground contact surface 2s. Referring to FIG. 4, under the normally inflated loaded condition, the main groove 9 may close due to deformed tread portion so that groove walls 10 thereof come into contact each other, since the further deformation of the tread portion 2 during traveling is prevented by the effect described above, the rolling resistance of the tire may be reduced. Moreover, since the inner parts 11 of the main groove 9 may deform so as to shape a tubular groove hole 13 therebetween for draining the water, the wet braking performance of the tire may also maintain.

When the inclination angle θd of the inner part 11 is more than 1 degree with a direction so that the groove width thereof enlarges toward the radially outside of the tire, the tubular groove hole 13 may not be shaped therebetween. When the inclination angle θd of the inner part 11 is more than 1 degree with a direction so that the groove width thereof enlarges toward the radially inside of the tire, the productivity thereof may be deteriorated.

In order to reduce the rolling resistance while maintaining the drainage performance of the tire, the inclination angle θu of the outer part 12 of the crown main groove 3 is preferably in a range of not less than 3 degrees, more preferably not less than 3.5 degrees, but preferably not more than 5 degrees, more preferably not more than 4.5 degrees. In the same view above, the inclination angle θu of the outer part 12 of the shoulder main groove 4 is preferably in a range of not less than 7 degrees, more preferably not less than 9 degrees, but preferably not more than 14 degrees, more preferably not more than 12 degrees.

The ratio W4/d1 of the groove width W4 to the groove depth d1 of the crown main groove 3 is preferably in a range of not less than 13%, more preferably not less than 20%, but preferably not more than 40%, more preferably not more than 33% in order to maintain the sufficient volume of the tubular groove hole 13 so that the rolling resistance may be improved while maintaining the steering stability of the tire.

Moreover, the ratio w5/d2 of the groove width w5 to the groove depth d2 of the shoulder main groove 4 is preferably in a range of not less than 53%, more preferably not less than 55%, but preferably not more than 70%, more preferably not more than 65% in order to further improve the rolling resistance while maintaining the steering stability of the tire as well as uneven wear resistance of the shoulder portion 7.

In order to maintain a sufficient volume of the tubular groove hole 13, a height h of the inner part 11 from the groove bottom 9b to the radially outer end 11e thereof is preferably in a range of from not less than 15%, more preferably not less than 18%, but more preferably not more than 25%, more preferably not more than 22% of the groove depth d3. When the height h is less than 15% of the groove depth d3, the radially outer ends 11e, 11e may not come into contact with each other, and the rolling resistance may not be reduced.

When the height h is more than 25% of the groove depth d3, an area that outer portions 12 come into contact with each other is liable to be small, and thereby the rolling resistance may not be reduced.

Preferably, width w6 between radially upper edges 11e of the inner parts 11 is in a range of not less than 18%, more preferably not less than 22%, but preferably not more than 28%, more preferably not more than 24% of the groove depth d3 of the main groove 9 in order to further improve the wet braking performance as well as the rolling resistance of the tire.

Preferably, the groove bottom 9b of the main groove 9 has a semi-circular shape in the groove cross section. More preferably, the semi-circular shape of the groove bottom 9b has a radius of curvature that is a half of the width w6. Such a groove bottom 9b may maintain the sufficient volume of the tubular groove hole 13 while preventing damage on the groove bottom 9b.

In one aspect of the present invention, the outer part 12 of the main groove 9 is preferably connected to the ground contact surface 2s of the tread portion 2 through a chamfer portion having a circular cross-section in order to enhance the tread rigidity.

Figure 5:
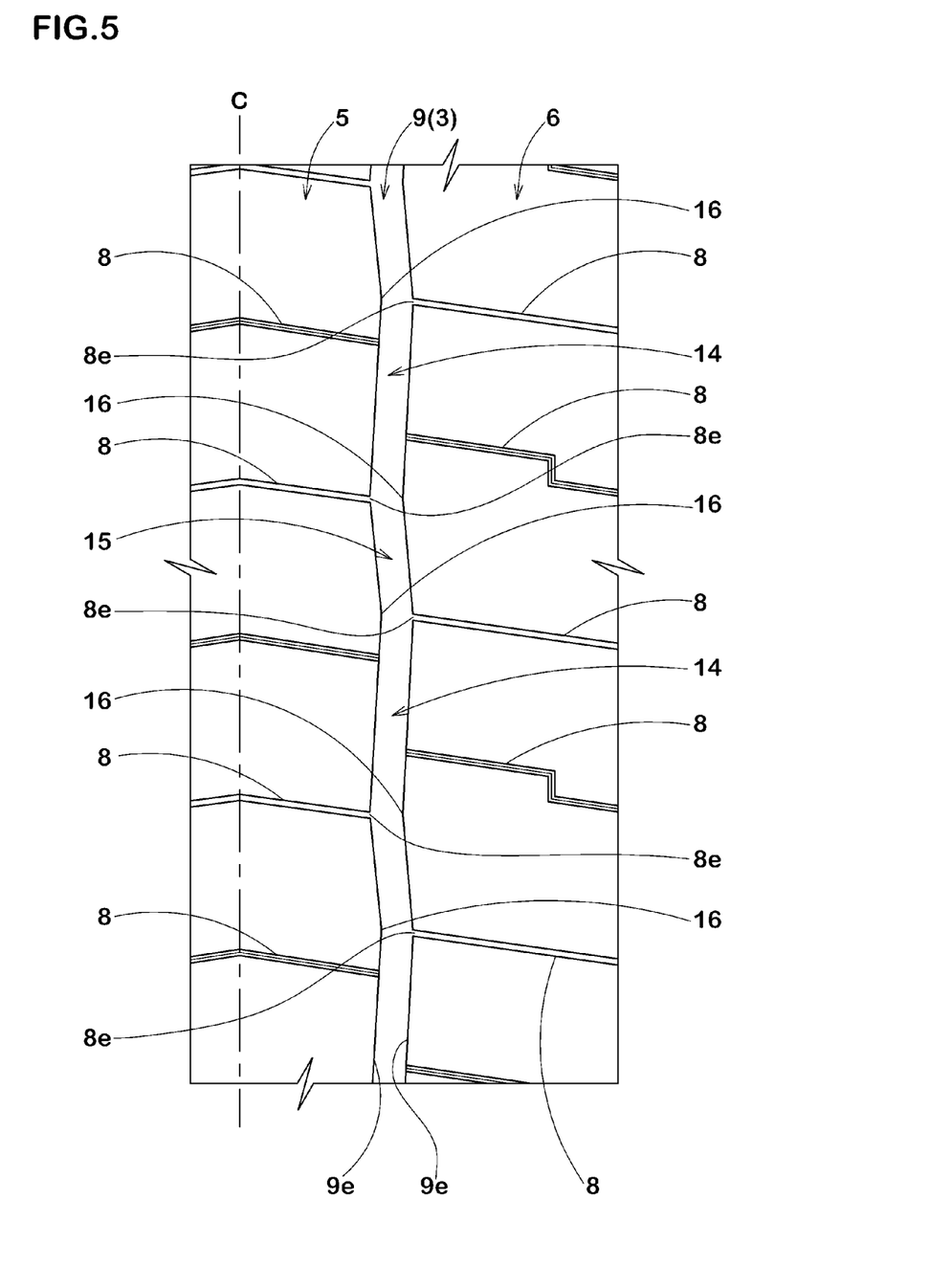
FIG. 5 is a partial enlarged view of FIG. 1.

Referring to FIG. 5, the main groove 9 is a zigzag groove which includes a first portion 14 inclined at one direction with respect to the circumferential direction of the tire and a second portion 15 inclined at an opposite direction to the first portion 14. The second portion 15 has a circumferential length smaller than that of the first portion 14. Such a main groove 9 may have an effect that a pair of groove edges 9e, 9e thereof engage each other in a ground contact patch when tire load has been loaded, and thereby the torsional rigidity of the tread portion 2 may be enhanced. With this, since the deformation of the tread portion 2 during traveling becomes less, the rolling resistance of the tire may be further reduced.

The crown portion 5 includes an external corner 16 that protrudes axially outside of the tire. At least one external corner 16 faces an axially inner end 8e of the lateral narrow groove 8 provided on the middle portion 6. In the event that the large tire load has been loaded, the external corner 16 may engage into the inner end 8e of the lateral narrow groove 8 so as to prevent the circumferentially deformation of the crown portion 5.

In case that the crown main groove 3 is formed as the zigzag groove including the first and second portion 14 and 15, at least four lateral narrow grooves 8 are preferably connected to each of the first portion 14. With this, since the drainage performance of the center region in the tread portion 2, the wet braking performance of the tire is further improved.

In order to reduce the rolling resistance of the tire while maintaining the wet braking performance thereof, the tread portion 2 preferably has a total length of each lateral component length of grooves in a range of not less than 20,000 mm, more preferably not less than 23,000 mm, but preferably not more than 30,000 mm, more preferably not more than 27,000 mm.

The present invention is more specifically described and explained by means of the following Examples and References. It is to be understood that the present invention is not limited to these Examples.

Comparison Test

Heavy-duty pneumatic tires having a tire size of 315/80R22.5 with basic tread patterns of FIG. 1 except for details shown in Table 1 were made and tested. The tire of Ref. 1 is the same to the Ex.1 except for the land ratio. The tire of Ref.2 is the same to the Ex.1 except that the inclination angles of the inner and outer parts of main grooves are the same. Test methods are as follows.

Rolling Resistance Test:

The test tire was mounted on a rim of 9.00×22.5 and inflated to an internal pressure of 825 kPa, and the rolling resistance of the tire was measured using a tester at a speed of 80 km/hr with a tire load of 31.65 kN. The reciprocal of the rolling resistance is shown in Table 1 by an index based on Ref.1 being 100, wherein the larger the index number, the better the rolling resistance is.

Wet Braking Performance Test:

The test tires were installed in a 2-D wheel type 8 ton truck with an ABS. The truck was driven on a wet asphalt road with 0.5-2.0 mm depth of water and was suddenly braked at a speed of 65 km/hr. The reciprocal number of the braking distance of each tire was measured. The results are shown with an index based on Ref.1 being 100. The larger the value, the better the wet braking performance is.

Table 1 Shows the Test Results.

TABLE 1-1

|  | Ref. 1 | Ref. 2 | Ex. 1 | Ex. 2 | Ex. 3 | Ex. 4 | Ex. 5 |
|---|---|---|---|---|---|---|---|
| Land ratio Sb/Sa (%) | 70 | 78 | 78 | 80 | 75 | 78 | 78 |
| Crown main groove width W4 (mm) | 6 | 6 | 6 | 2 | 8 | 6 | 6 |
| Crown main groove depth d1 (mm) | 17.5 | 17.5 | 17.5 | 17.5 | 17.5 | 15 | 20 |
| Shoulder main groove width W5 (mm) | 11.5 | 11.5 | 11.5 | 11.5 | 11.5 | 11.5 | 11.5 |
| Shoulder main groove depth d2 (mm) | 17.5 | 17.5 | 17.5 | 17.5 | 17.5 | 17.5 | 17.5 |
| Lateral narrow groove width W7 (mm) | 1 | 1 | 1 | 1 | 1 | 1 | 1 |
| Lateral narrow groove depth d5 (mm) | 17.5 | 17.5 | 17.5 | 17.5 | 17.5 | 17.5 | 17.5 |
| Total length of lateral component of grooves L (mm) | 25,000 | 25,000 | 25,000 | 25,000 | 25,000 | 25,000 | 25,000 |
| Angle θd of inner part of crown main groove (deg.) | 0.5 | 2 | 0.5 | 0.5 | 0.5 | 0.5 | 0.5 |
| Angle θu of outer part of crown main groove (deg.) | 4 | — | 4 | 4 | 4 | 4 | 4 |
| Angle θd of inner part of shoulder main groove (deg.) | 0.5 | 2 | 0.5 | 0.5 | 0.5 | 0.5 | 0.5 |
| Angle θu of outer part of shoulder main groove (deg.) | 13 | — | 13 | 13 | 13 | 13 | 13 |
| Ratio h/d3 (%) | 15 | — | 15 | 15 | 15 | 15 | 15 |
| Number of lateral narrow grooves connected to first portion of crown main groove | 4 | 4 | 4 | 4 | 4 | 4 | 4 |
| Rolling resistance (Index) | 80 | 90 | 100 | 105 | 94 | 108 | 90 |
| Wet braking performance (Index) | 110 | 110 | 100 | 90 | 105 | 90 | 105 |

TABLE 1-1-continued

|  | Ex. 6 | Ex. 7 | Ex. 8 | Ex. 9 | Ex. 10 |
| --- | --- | --- | --- | --- | --- |
| Land ratio Sb/Sa (%) | 79 | 76 | 78 | 78 | 78 |
| Crown main groove width W4 (mm) | 6 | 6 | 6 | 6 | 6 |
| Crown main groove depth d1 (mm) | 17.5 | 17.5 | 17.5 | 17.5 | 17.5 |
| Shoulder main groove width W5 (mm) | 8 | 14 | 11.5 | 11.5 | 11.5 |
| Shoulder main groove depth d2 (mm) | 17.5 | 17.5 | 15 | 20 | 17.5 |
| Lateral narrow groove width W7 (mm) | 1 | 1 | 1 | 1 | 0.6 |
| Lateral narrow groove depth d5 (mm) | 17.5 | 17.5 | 17.5 | 17.5 | 17.5 |
| Total length of lateral component of grooves L (mm) | 25,000 | 25,000 | 25,000 | 25,000 | 25,000 |
| Angle θd of inner part of crown main groove (deg.) | 0.5 | 0.5 | 0.5 | 0.5 | 0.5 |
| Angle θu of outer part of crown main groove (deg.) | 4 | 4 | 4 | 4 | 4 |
| Angle θd of inner part of shoulder main groove (deg.) | 0.5 | 0.5 | 0.5 | 0.5 | 0.5 |
| Angle θu of outer part of shoulder main groove (deg.) | 13 | 13 | 13 | 13 | 13 |
| Ratio h/d3 (%) | 15 | 15 | 15 | 15 | 15 |
| Number of lateral narrow grooves connected to first portion of crown main groove | 4 | 4 | 4 | 4 | 4 |
| Rolling resistance (Index) | 103 | 97 | 105 | 93 | 101 |
| Wet braking performance (Index) | 93 | 102 | 94 | 103 | 99 |

TABLE 1-2

|  | Ex. 11 | Ex. 12 | Ex. 13 | Ex. 14 | Ex. 15 | Ex. 16 | Ex. 17 |
| --- | --- | --- | --- | --- | --- | --- | --- |
| Land ratio Sb/Sa (%) | 78 | 78 | 78 | 78 | 78 | 78 | 78 |
| Crown main groove width W4 (mm) | 6 | 6 | 6 | 6 | 6 | 6 | 6 |
| Crown main groove depth d1 (mm) | 17.5 | 17.5 | 17.5 | 17.5 | 17.5 | 17.5 | 17.5 |
| Shoulder main groove width W5 (mm) | 11.5 | 11.5 | 11.5 | 11.5 | 11.5 | 11.5 | 11.5 |
| Shoulder main groove depth d2 (mm) | 17.5 | 17.5 | 17.5 | 17.5 | 17.5 | 17.5 | 17.5 |
| Lateral narrow groove width W7 (mm) | 2 | 1 | 1 | 1 | 1 | 1 | 1 |
| Lateral narrow groove depth d5 (mm) | 17.5 | 15 | 20 | 17.5 | 17.5 | 17.5 | 17.5 |
| Total length of lateral component of grooves L (mm) | 25,000 | 25,000 | 25,000 | 20,000 | 30,000 | 40,000 | 25,000 |
| Angle θd of inner part of crown main groove (deg.) | 0.5 | 0.5 | 0.5 | 0.5 | 0.5 | 0.5 | 0 |
| Angle θu of outer part of crown main groove (deg.) | 4 | 4 | 4 | 4 | 4 | 4 | 4 |
| Angle θd of inner part of shoulder main groove (deg.) | 0.5 | 0.5 | 0.5 | 0.5 | 0.5 | 0.5 | 0.5 |
| Angle θu of outer part of shoulder main groove (deg.) | 13 | 13 | 13 | 13 | 13 | 13 | 13 |
| Ratio h/d3 (%) | 15 | 15 | 15 | 15 | 15 | 15 | 15 |
| Number of lateral narrow grooves connected to first portion of crown main groove | 4 | 4 | 4 | 4 | 4 | 4 | 4 |
| Rolling resistance (Index) | 98 | 102 | 98 | 104 | 94 | 80 | 101 |
| Wet braking performance (Index) | 102 | 98 | 102 | 95 | 105 | 115 | 99 |

|  | Ex. 18 | Ex. 19 | Ex. 20 | Ex. 21 | Ex. 22 |
| --- | --- | --- | --- | --- | --- |
| Land ratio Sb/Sa (%) | 78 | 78 | 78 | 78 | 78 |
| Crown main groove width W4 (mm) | 6 | 6 | 6 | 6 | 6 |
| Crown main groove depth d1 (mm) | 17.5 | 17.5 | 17.5 | 17.5 | 17.5 |
| Shoulder main groove width W5 (mm) | 11.5 | 11.5 | 11.5 | 11.5 | 11.5 |
| Shoulder main groove depth d2 (mm) | 17.5 | 17.5 | 17.5 | 17.5 | 17.5 |
| Lateral narrow groove width W7 (mm) | 1 | 1 | 1 | 1 | 1 |
| Lateral narrow groove depth d5 (mm) | 17.5 | 17.5 | 17.5 | 17.5 | 17.5 |
| Total length of lateral component of grooves L (mm) | 25,000 | 25,000 | 25,000 | 25,000 | 25,000 |
| Angle θd of inner part of crown main groove (deg.) | 1 | 0.5 | 0.5 | 0.5 | 0.5 |
| Angle θu of outer part of crown main groove (deg.) | 4 | 3 | 5 | 4 | 4 |
| Angle θd of inner part of shoulder main groove (deg.) | 0.5 | 0.5 | 0.5 | 0 | 1 |
| Angle θu of outer part of shoulder main groove (deg.) | 13 | 13 | 13 | 13 | 13 |
| Ratio h/d3 (%) | 15 | 15 | 15 | 15 | 15 |
| Number of lateral narrow grooves connected to first portion of crown main groove | 4 | 4 | 4 | 4 | 4 |

TABLE 1-2-continued

|  |  |  |  |  |  |
|---|---|---|---|---|---|
| Rolling resistance (Index) | 99 | 101 | 99 | 101 | 99 |
| Wet braking performance (Index) | 101 | 99 | 101 | 99 | 101 |

TABLE 1-3

|  | Ex. 23 | Ex. 24 | Ex. 25 | Ex. 26 | Ex. 27 | Ex. 28 | Ex. 29 |
|---|---|---|---|---|---|---|---|
| Land ratio Sb/Sa (%) | 78 | 78 | 78 | 78 | 78 | 78 | 78 |
| Crown main groove width W4 (mm) | 6 | 6 | 6 | 6 | 6 | 6 | 6 |
| Crown main groove depth d1 (mm) | 17.5 | 17.5 | 17.5 | 17.5 | 17.5 | 17.5 | 17.5 |
| Shoulder main groove width W5 (mm) | 11.5 | 11.5 | 11.5 | 11.5 | 11.5 | 11.5 | 11.5 |
| Shoulder main groove depth d2 (mm) | 17.5 | 17.5 | 17.5 | 17.5 | 17.5 | 17.5 | 17.5 |
| Lateral narrow groove width W7 (mm) | 1 | 1 | 1 | 1 | 1 | 1 | 1 |
| Lateral narrow groove depth d5 (mm) | 17.5 | 17.5 | 17.5 | 17.5 | 17.5 | 17.5 | 17.5 |
| Total length of lateral component of grooves L (mm) | 25,000 | 25,000 | 25,000 | 25,000 | 25,000 | 25,000 | 25,000 |
| Angle θd of inner part of crown main groove (deg.) | 0.5 | 0.5 | 0.5 | 0.5 | 0.5 | 0.5 | 0.5 |
| Angle θu of outer part of crown main groove (deg.) | 4 | 4 | 4 | 4 | 4 | 4 | 4 |
| Angle θd of inner part of shoulder main groove (deg.) | 0.5 | 0.5 | 0.5 | 0.5 | 0.5 | 0.5 | 0.5 |
| Angle θu of outer part of shoulder main groove (deg.) | 7 | 14 | 13 | 13 | 13 | 13 | 13 |
| Ratio h/d3 (%) | 15 | 15 | 5 | 25 | 30 | 15 | 15 |
| Number of lateral narrow grooves connected to first portion of crown main groove | 4 | 4 | 4 | 4 | 4 | 2 | 3 |
| Rolling resistance (Index) | 103 | 99 | 105 | 94 | 87 | 100 | 100 |
| Wet braking performance (Index) | 97 | 101 | 95 | 105 | 110 | 97 | 98 |

From the test results, it was confirmed that tires in accordance with the present invention can be effectively improved the rolling resistance while maintaining the wet braking performance.

The invention claimed is:

1. A pneumatic tire comprising
a tread portion provided with a pair of circumferentially extending crown main grooves disposed on both sides of a tire equator to define a crown portion therebetween, the crown main grooves having groove widths in a range of from 2.0 to 8.0 mm and groove depths in a range of from 15.0 to 20.0 mm, a pair of circumferentially extending shoulder main grooves disposed axially outside the crown main grooves to form a pair of middle portions each of which is between the shoulder main groove and the crown main groove in each side of the tire equator, the shoulder main grooves having groove widths in a range of from 8.0 to 14.0 mm and groove depths in a range of from 15.0 to 20.0 mm and a plurality of lateral narrow grooves having groove widths in a range of from 0.6 to 2.0 mm and groove depths in a range of from 15.0 to 20.0 mm,
said lateral narrow grooves including a plurality of crown lateral narrow grooves each of which traverses said crown portions and a plurality of middle lateral narrow grooves each of which traverses said middle portions, and said tread portion having a land ratio in a range of from 75% to 80%,
wherein
each of said crown main grooves and shoulder main grooves has a groove cross section including a groove bottom and a pair of groove walls each extending from the groove bottom to a ground contact surface of said tread portion,
each groove wall includes an inner part and an outer part, the inner part of the groove wall has an inclination in a range of not more than 1 degree with respect to a groove centerline in the groove cross section, and the outer part is provided between the inner part and the ground contact surface of the tread portion and has an inclination larger than that of the inner part so as to enlarge the groove width thereof toward the ground contact surface, and
said tread portion has a total length of each lateral component length of grooves in a range of 20,000 to 30,000 mm.

2. The tire according to claim 1,
wherein each of said crown main grooves and shoulder main grooves is a zigzag groove which includes a first portion inclined in one direction with respect to a circumferential direction of the tire and a second portion inclined in an opposite direction to the first portion, and the second portion has a circumferential length smaller than that of the first portion.

3. The tire according to claim 2,
wherein at least four lateral narrow grooves are connected to each of the first portion of said crown main grooves.

4. The tire according to claim 1,
wherein the inner part of the groove wall has a height in a range of from 15% to 25% with respect to a groove depth thereof.

5. The tire according to claim 1, wherein
each of said crown main grooves has the inclination of the outer part of the groove wall smaller than that of said shoulder main grooves.

6. The tire according to claim 1, wherein
each of said crown main grooves has the inclination of the outer part of the groove wall in a range of from 3 to 5 degrees, and
each of said shoulder main grooves has the inclination of the outer part of the groove wall in a range of from 7 to 14 degrees.

7. The tire according to claim 1, wherein
said crown lateral narrow grooves include a V-shaped groove, and said middle lateral narrow grooves include a step-shaped groove.

8. A pneumatic tire comprising:
a tread portion provided with a pair of circumferentially extending crown main grooves disposed on both sides of a tire equator to define a crown portion therebetween, the crown main grooves having groove widths in a range of from 2.0 to 8.0 mm and groove depths in a range of from 15.0 to 20.0 mm, a pair of circumferentially extending shoulder main grooves disposed axially outside the crown main grooves to form a pair of middle portions each of which is between the shoulder main groove and the crown main groove in each side of the tire equator, the shoulder main grooves having groove widths in a range of from 8.0 to 14.0 mm, and groove depths in a range of from 15.0 to 20.0 mm and a plurality of lateral narrow grooves having groove widths in a range of from 0.6 to 2.0 mm and groove depths in a range of from 15.0 to 20.0 mm,
said lateral narrow grooves including a plurality of crown lateral narrow grooves each of which traverses said crown portions and a plurality of middle lateral narrow grooves each of which traverses said middle portions, and
said tread portion having a land ratio in a range of from 75% to 80%,
wherein
each of said crown main grooves and shoulder main grooves has a groove cross section including a groove bottom and a pair of groove walls each extending from the groove bottom to a ground contact surface of said tread portion,
each groove wall includes an inner part and an outer part, the inner part of the groove wall has an inclination in a range of not more than 1 degree with respect to a groove centerline in the groove cross section, and the outer part is provided between the inner part and the ground contact surface of the tread portion and has an inclination larger than that of the inner part so as to enlarge the groove width thereof toward the ground contact surface, and
each of said crown main grooves and shoulder main grooves is a zigzag groove which includes a first portion inclined in one direction with respect to a circumferential direction of the tire and a second portion inclined in an opposite direction to the first portion, and the second portion has a circumferential length smaller than that of the first portion.

9. The tire according to claim 8,
wherein at least four lateral narrow grooves are connected to each first portion of said crown main grooves.

10. The tire according to claim 8,
wherein the inner part of the groove wall has a height in a range of from 15% to 25% with respect to a groove depth thereof.

11. The tire according to claim 8,
wherein each of said crown main grooves has the inclination of the outer part of the groove wall smaller than that of said shoulder main grooves.

12. The tire according to claim 8,
wherein each of said crown main grooves has the inclination of the outer part of the groove wall in a range of from 3 to 5 degrees, and each of said shoulder main grooves has the inclination of the outer part of the groove wall in a range of from 7 to 14 degrees.

13. The tire according to claim 8,
wherein said crown lateral narrow grooves include a v-shaped groove, and said middle lateral narrow grooves include a step-shaped groove.

14. A pneumatic tire comprising:
a tread portion provided with a pair of circumferentially extending crown main grooves disposed on both sides of a tire equator to define a crown portion therebetween, the crown main grooves having groove widths in a range of from 2.0 to 8.0 mm and groove depths in a range of from 15.0 to 20.0 mm, a pair of circumferentially extending shoulder main grooves disposed axially outside the crown main grooves to form a pair of middle portions each of which is between the shoulder main groove and the crown main groove in each side of the tire equator, the shoulder main grooves having groove widths in a range of from 8.0 to 14.0 mm and groove depths in a range of from 15.0 to 20.0 mm and a plurality of lateral narrow grooves having groove widths in a range of from 0.6 to 2.0 mm and groove depths in a range of from 15.0 to 20.0 mm,
said lateral narrow grooves including a plurality of crown lateral narrow grooves each of which traverses said crown portions and a plurality of middle lateral narrow grooves each of which traverses said middle portions, and
said tread portion having a land ratio in a range of from 75% to 80%,
wherein
each of said crown main grooves and shoulder main grooves has a groove cross section including a groove bottom and a pair of groove walls each extending from the groove bottom to a ground contact surface of said tread portion,
each groove wall includes an inner part and an outer part, the inner part of the groove wall has an inclination in a range of not more than 1 degree with respect to a groove centerline in the groove cross section, and the outer part is provided between the inner part and the ground contact surface of the tread portion and has an inclination larger than that of the inner part so as to enlarge the groove width thereof toward the ground contact surface, and
each of said crown main grooves has the inclination of the outer part of the groove wall smaller than that of said shoulder main grooves.

15. The tire according to claim 14,
wherein at least four lateral narrow grooves are connected to each first portion of said crown main grooves.

16. The tire according to claim 14,
wherein the inner part of the groove wall has a height in a range of from 15% to 25% with respect to a groove depth thereof.

17. The tire according to claim 14,
wherein each of said crown main grooves has the inclination of the outer part of the groove wall in a range of from 3 to 5 degrees, and each of said shoulder main grooves has the inclination of the outer part of the groove wall in a range of from 7 to 14 degrees.

18. The tire according to claim 14,
wherein said crown lateral narrow grooves include a v-shaped groove, and said middle lateral narrow grooves include a step-shaped groove.

* * * * *